United States Patent [19]
Ito

[11] 3,837,498
[45] Sept. 24, 1974

[54] AUTOMATIC FILTER
[76] Inventor: Kyoji Ito, No. 4 Nishi Inzo-cho, Seto, Japan
[22] Filed: June 11, 1973
[21] Appl. No.: 369,090

[30] Foreign Application Priority Data
Feb. 20, 1973 Japan.............................. 48-19750

[52] U.S. Cl.................................. 210/387, 210/396
[51] Int. Cl........................................... B01d 33/02
[58] Field of Search..................... 210/387, 396, 397

[56] References Cited
UNITED STATES PATENTS
2,009,382  7/1935  Blaufuss......................... 210/396 X
3,651,946  3/1972  Ball et al............................ 210/387

Primary Examiner—Roy Lake
Assistant Examiner—DeWalden W. Jones
Attorney, Agent, or Firm—Weingarten, Maxham & Schurgin

[57] ABSTRACT

An automatic filter which is characterized in that a liquid permeable long filter belt is rolled onto an upper tubular shaft and a lower shaft, and said filter belt and said upper tubular shaft are encased in a filter box to receive the liquid to be filtered. During the filtration, the filtrate is passed through the core material of said filter belt to a plurality of small apertures of said upper tubular shaft and discharged through said upper tubular shaft, while the filter cake is accumulated between the layers of rolled filter belt, and after the filtration, said filter cake is discharged by unrolling said filter belt from said upper tubular shaft to said lower shaft.

5 Claims, 15 Drawing Figures

AUTOMATIC FILTER

This invention relates to an automatic filter. More particularly, the invention relates to an automatic pressure filter which is very much improved in the operation efficiency.

In the ordinary art, for example, when a plate and frame type pressure filter is used, it is necessary to disassemble the filter plates in order to discharge the accumulated filter cake after the filtration, which requires very much time and troubles in the filtration process.

Therefore, the principal object of the present invention is to eliminate such disadvantages being caused in the conventional method, especially in the pressure filtration. Further object of the invention is to propose a novel and improved automatic pressure filter in order to simplify the filtering operation and raise the working efficiency.

Pursuant to the above objects of the present invention, a novel automatic filter is proposed in which a filter box is provided at the center portion thereof with a hollow tubular horizontal rotatable shaft having a plurality of small apertures; another horizontal shaft is provided in the outside portion of said filter box in parallel with said tubular horizontal shaft; a flexible or foldable and liquid permeable long filter belt is attached between said tubular horizontal shaft and said another horizontal shaft in the outside of said filter box so as to be rolled and unrolled on said shafts; a retractable plate to pass said filter belt and to discharge filter cake is provided on one portion of said filter box; and said filter box, filter belt and retractable plate are disposed so as to discharge the filtrate from the filter belt through the core material portion of said filter belt to the outside and, at the same time, discharge automatically the filter cake between the layers of rolled filter belt during the unrolling of the filter belt and the opening of said retractable plate.

These and other objects and features of the invention will become more apparent from the following description taken in connection with the accompanying drawings in which.

Figure 1:
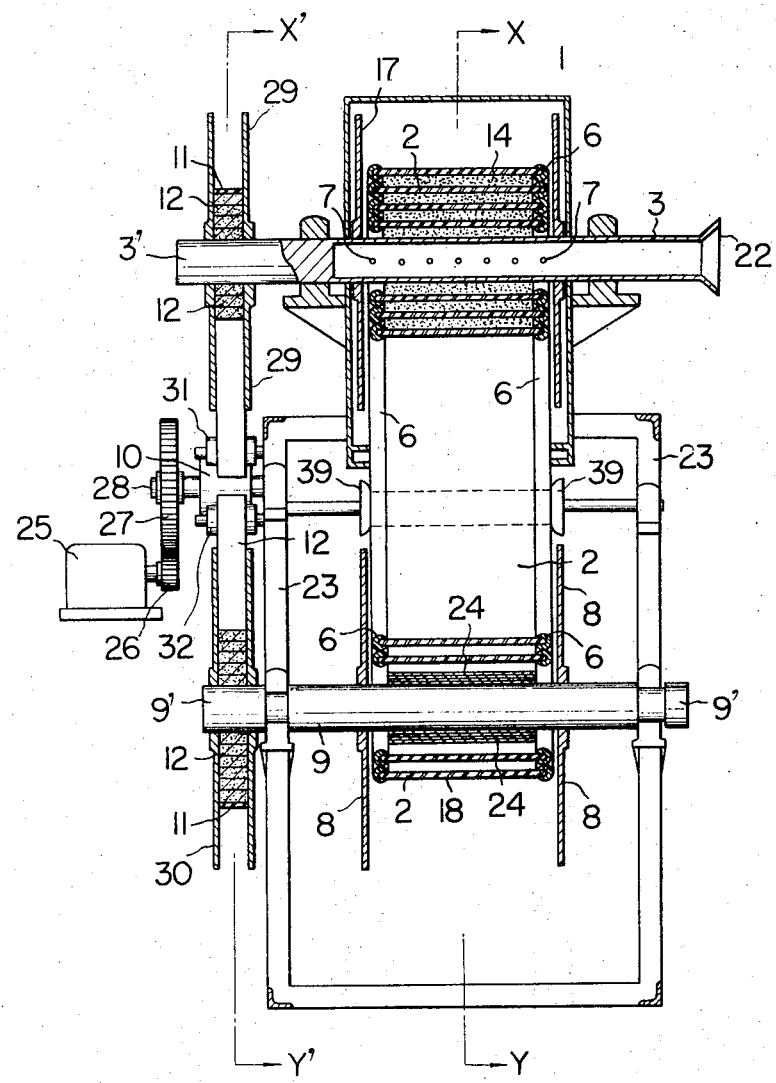
FIG. 1 is a cross-sectional front elevation of an automatic filter of the present invention in which filter cake being discharged partly.

Referring now to the drawings, especially to FIG. 1, the automatic filter of the present invention comprises a filter box 1 in the shape of a short cylinder, and the center of which is provided with a rotatable upper horizontal shaft 3 of a hollow pipe. A plurality of small apertures 7 are formed on the surface of said horizontal shaft 3 for receiving the filtrate, and a long filter belt 2 is provided around said shaft 3 which can be rolled and unrolled in the operation.

Figure 5:
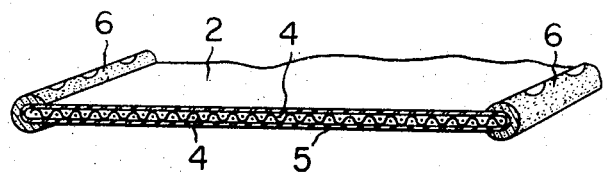
FIG. 5 is a perspective view of the filter belt showing the cross-section thereof.

The filter belt 2 is a long band which comprises, as shown in FIG. 5, a liquid permeable tough core material 4 such as wire-netting, a liquid permeable filter member 5 such as cloth covering said core material 4, and elastic and flexible supports 6 covering both longitudinal edges of said band which are made of, for example, rubber. Therefore, this filter belt 2 can be rolled and unrolled without difficulty and it has durability. In the filtration, the fed liquid is filtered through the filter members 5 on both sides, the filtrate is discharged through the liquid permeable core material 4, and the filter cake is attached on the outside of the filter belt 2.

Figure 9:
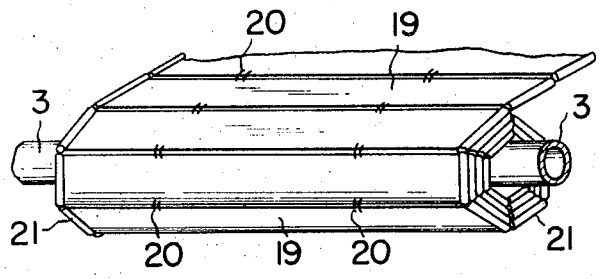
FIG. 9 is a fragmentary perspective view of another embodiment of the filter belt which comprises a combination of elongated filter cloth frames.

Besides the above-mentioned flexible filter belt 2 as shown in FIG. 5, a combination of a plurality of plate-like filter frames 19 as shown in FIG. 9 may be used. Said filter frame 19 are linked together by connecting members 20 having liquid passages in flexible manner to form a long band, and both ends of said filter frame 19 are provided with protective supports 21, so that this filter belt can be rolled and unrolled on the horizontal shafts 3 and 9.

Figure 10:
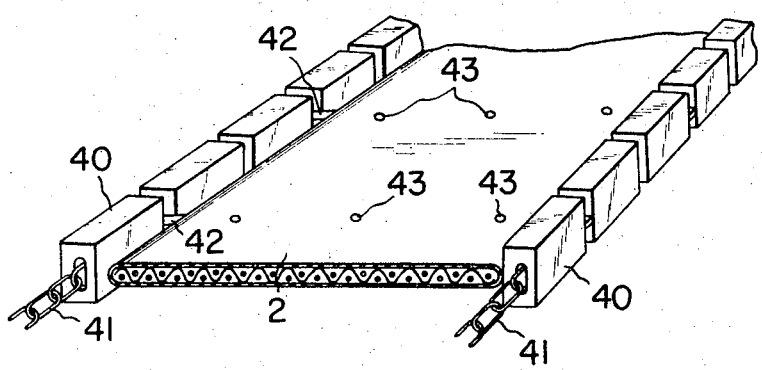
FIG. 10 is a fragmentary perspective view of still other embodiment of the filter belt.
Figure 11:
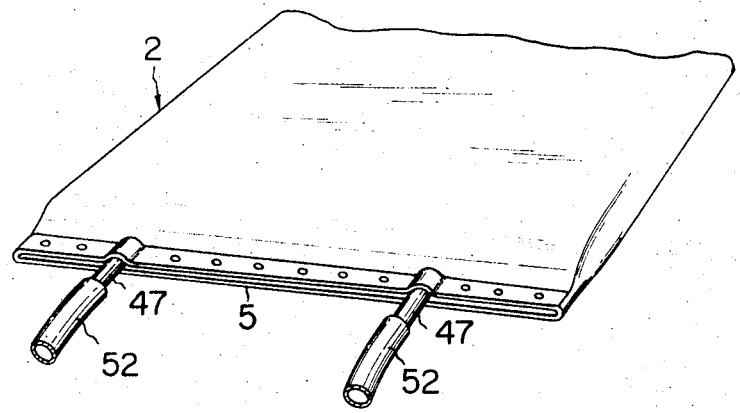
FIG. 11 is a fragmentary perspective view of the filter portion of the filter belt as shown in FIG. 10.
Figure 12:
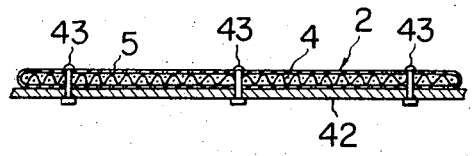
FIG. 12 is a fragmentary cross-sectional view of the filter belt showing the attachment of a supporting rod thereto.
Figure 13:
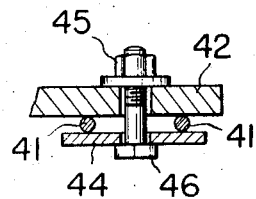
FIG. 13 is a fragmentary cross-sectional view showing the attachment of the supporting rod and the chain.
Figure 14:
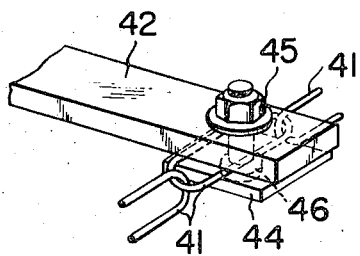
FIG. 14 is a fragmentary perspective view of the same portion as shown in FIG. 13.
Figure 15:
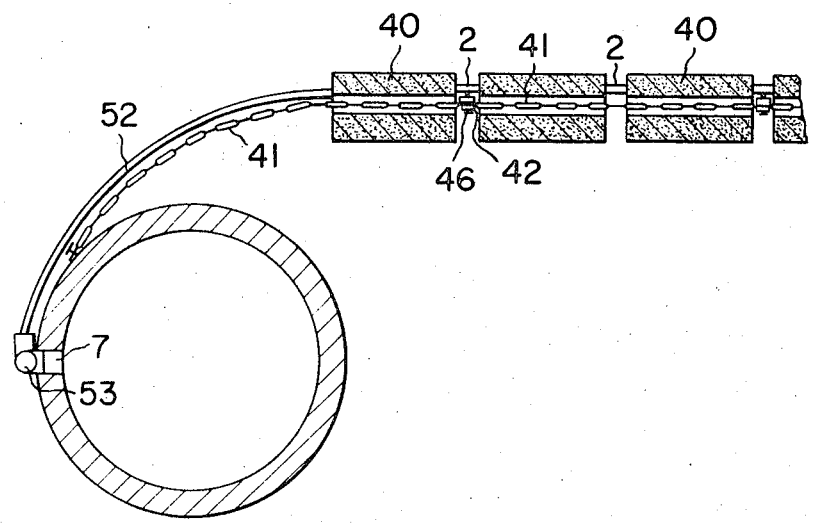
FIG. 15 is a fragmentary cross-sectional view showing the attachment of the filter belt as shown in FIG. 10 to the upper horizontal shaft.

In another embodiment of the filter belt as shown in FIG. 10, both sides of the belt 2 are provided with a plurality of supporting pieces 40 made of for example hard rubber or synthetic plastics. These supporting pieces 40 are connected together by chains 41 or other suitable wires in rows, and supporting rods 42 are provided between said supporting pieces 40. Further, as shown in FIG. 12, the filter belt 2 is secured to the supporting rod 42 by means of set screws 43, in which the flexibility of the filter belt 2 is not hindered in particular. Both end portions of said supporting rod 42 are fixed to said chain 41 linking said supporting pieces 40, as shown in FIGS. 13 and 14, by a keep plate 44 and a clamping bolt 46 with a nut 45. Further, the filter belt 2 as shown in FIG. 11 comprises a liquid permeable core material 4 which is covered with also liquid permeable filter member 5, and generally provided with exhaust pipes 47 at the end portion of the belt to discharge the filtrate.

By the use of the filter belt 2 having the structure as shown in FIGS. 10 to 14, the filter belt 2 can be rolled or unrolled by imparting the driving force mainly to the supporting pieces 40, therefore the filter belt 2 itself is not caused any external force, and the filter belt 2 is prevented from damages to bring long durability.

As disclosed in the above, the portion of the upper tubular shaft 3 where the filter belt being attached, is provided with a plurality of small apertures 7, through which the filtrate from the core material of filter belt 2 is introduced into the upper horizontal shaft 3, and the filtrate is then discharged from the filtrate outlet 22 at one end of said horizontal shaft 3 to the outside of the filter box 1. In the meantime, the filtrate can be discharged through an exhaust pipe by providing it in place of the above-mentioned hollow portion in the horizontal shaft 3.

Figure 6:
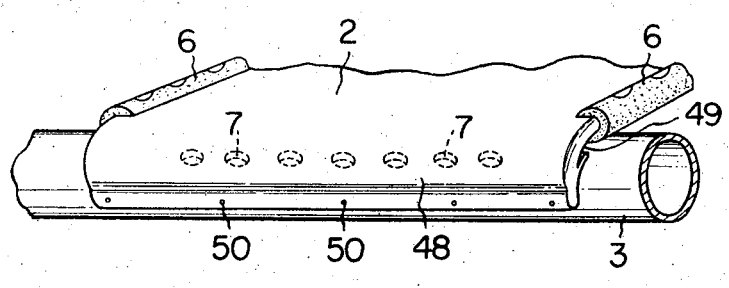
FIG. 6 is a fragmentary perspective view of a portion of the upper horizontal shaft showing the attachment of the filter belt to said shaft.
Figure 7:
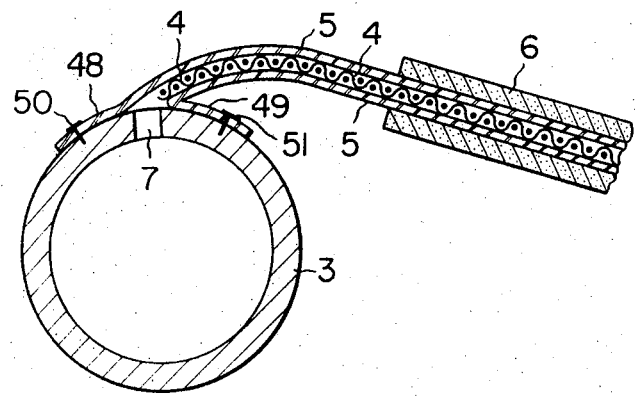
FIG. 7 is an enlarged cross-sectional side view of the same portion as shown in FIG. 6.

In case the filter belt 2 has a structure as shown in FIG. 5, the filter belt may be attached to the upper horizontal shaft 3 in like manner as FIGS. 6 and 7. That is, the end portion of the filter member 5 is divided into an upper flap 48 and a lower flap 49, and respective flaps are attached to the horizontal shaft 3 by means of setting studs 50 and 51. While, the edge portion of the liquid permeable core material 4 is faced to the above-mentioned small apertures 7 so as to communicate with the inside hollow portion of the horizontal shaft 3. Thereby the filtrate can be passed through the filter member 5, liquid permeable core material 4 and apertures 7 into the hollow portion of the shaft 3.

In case the filter belt 2 has the structure as shown in FIGS. 10 to 15, the exhaust pipes 47 are communicated with the small apertures 7 on the hollow portion of the horizontal shaft 3 by way of connecting pipes 52 (flexible ones are preferable) and a common connecting pipe 53, thus the filtrate from the filter belt 2 through the exhaust pipes 47 can be led into the hollow portion of the horizontal shaft 3. Further, the end portions of the chains 41 (or wires) which linking the supporting pieces 40 of the filter belt are fixed to side portions of the horizontal shaft 3, thereby the whole of the filter belt 2 can be rolled around the horizontal shaft 3.

Said exhaust pipes 47 of the filter belt 2 are embedded in the core material 4 of the end portion of filter belt 2, and if necessary, a plurality of small apertures can be provided around the embedded portion so as to pass the filtrate therethrough and to keep good permeability to the filtrate into the exhaust pipes 47 even when the core material 4 is partly compressed and become thin.

Coming back to FIG. 1, a lower horizontal shaft 9 is provided in a framework 23 having thereon the filter box 1, and a reel 8 is rotatably mounted to said horizontal shaft 9.

The positions of said filter box 1 and said reel 8 on the horizontal shaft 9 can be vertically changed with each other, or they can be disposed on the same horizontal plane.

Figure 2:
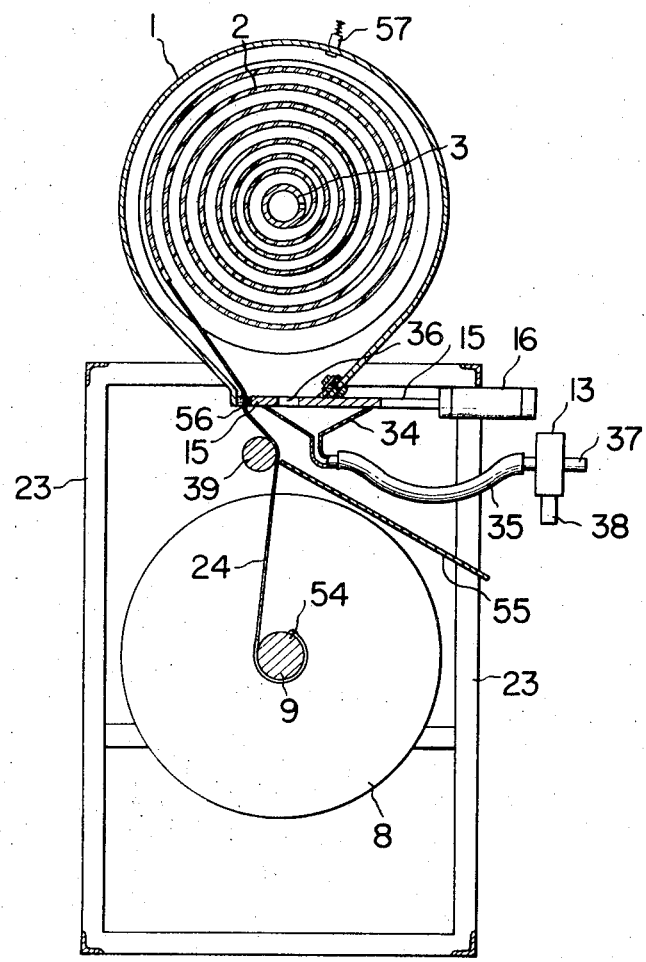
FIG. 2 is a cross-sectional side view taken along the line X-Y in FIG. 1 in which all filter belt is rolled in the filter box and the charge of liquid to be filtered is awaited.
Figure 8:
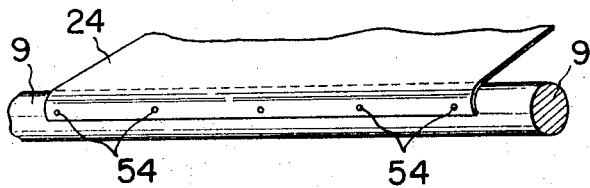
FIG. 8 is a fragmentary perspective view of the lower horizontal shaft showing the attachment of a flexible stainless steel sheet attached to the lower end of the filter belt.

A flexible belt 24 made of stainless steel sheet is attached to the lower portion of said filter belt 2, and as shown in FIGS. 2 and 8, said flexible belt 24 is attached to the lower horizontal shaft 9 by a plurality of setting studs 54, thereby the flexible belt 24 together with the filter belt 2 can be rolled or unrolled on the lower horizontal shaft 9.

Figure 4:
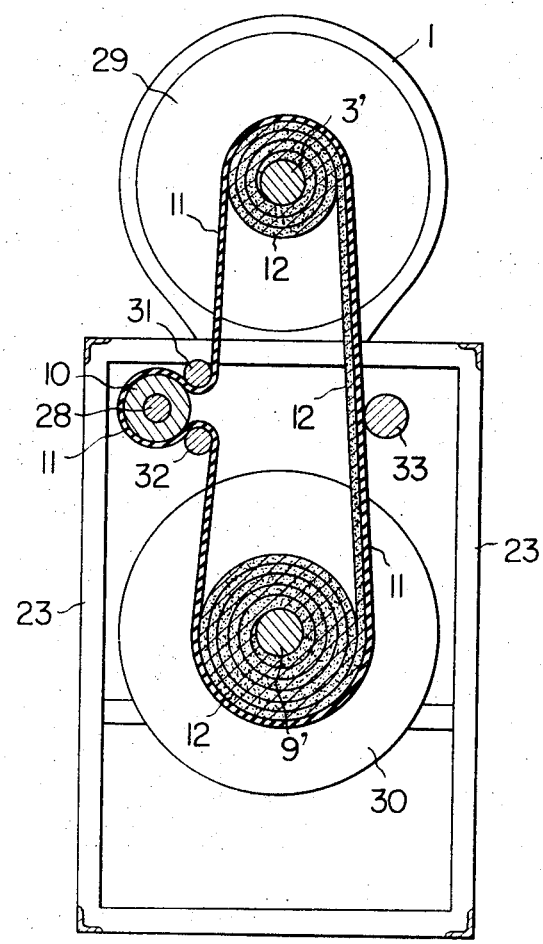
FIG. 4 is a cross-sectional side view taken along the line X' - Y' in FIG. 1.

In the following the device for rolling or unrolling the filter belt 2 will be explained. As shown in FIGS. 1 and 4, a shaft 28 is rotated by an electric motor 25 through two meshing gears 26 and 27, and said shaft 28 is provided with a belt pulley 10 to frictionally drive a belt 11. This belt 11 drives another belt 12 which is fitted rollably and unrollably to the elongated portions 3' and 9' of the upper and lower horizontal shafts 3 and 9, respectively. Both of these elongated portions 3' and 9' are made integrally with said horizontal shafts 3 and 9, and are rotated with them.

The above-mentioned belt 12 in addition to the belt 11 is, as shown in FIGS. 1 and 4, received in spools 29 and 30 which are secured to the elongated portions 3' and 9' of the horizontal shafts 3 and 9, respectively. Accordingly, the former belt 11 is moved by the rotation of the pulley 10, and the latter belt 12 is thereby moved with the belt 11 to drive the elongated portions 3' and 9' together with the horizontal shafts 3 and 9 in the filter box 1 and the framework 23, thereby the rolling and unrolling of the filter belt 2 can be carried out.

In FIGS. 1 and 4, the numerals 31, 32 and 33 indicate the guide rollers for the belt 11.

When the belt 12 is wound on the elongated portion 3' of the upper horizontal shaft 3 by the frictional driving of the belt 11, the other portion of belt 12 on the elongated portion 9' of the lower horizontal shaft 9 is unrolled and goes upwards, at the same time, the filter belt 2 is also moved upwards and wound by the upper horizontal shaft 3. The continual operation of filtration may be carried out by the above process of working.

Only an exemplary driving mechanism is shown in the above, while any other equivalent devices may be used in place of the above mechanism.

Figure 3:
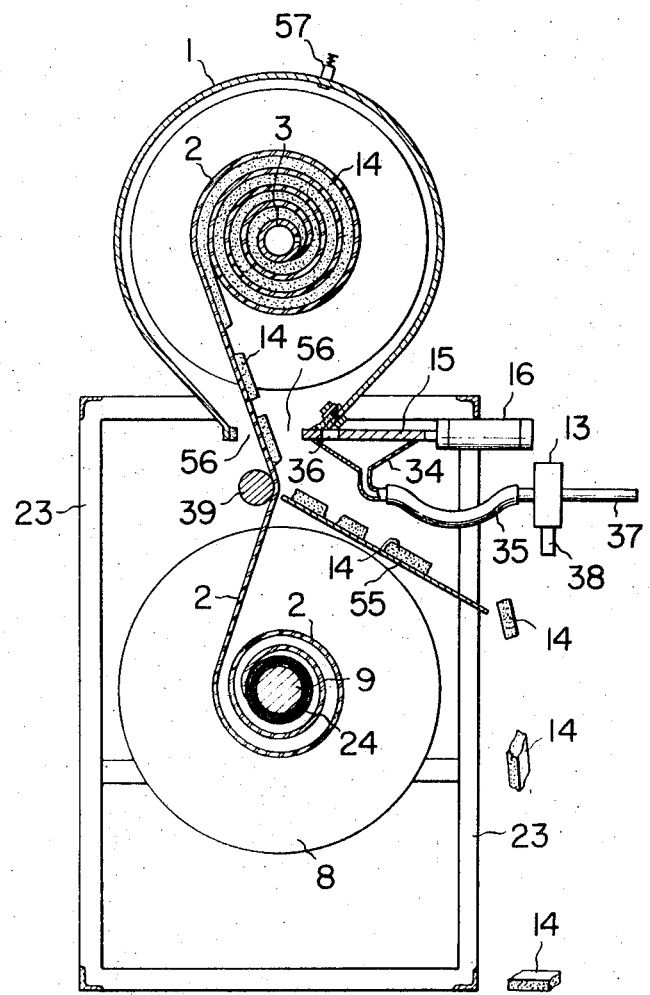
FIG. 3 is a cross-sectional side view taken along the line X-Y in FIG. 1 in which the filter belt is unrolled and the filter cake is discharged.

Then as shown in FIGS. 2 and 3, a shutter plate 15 for the discharge of filter cake is attached to the lower portion of the filter box 1, and said plate 15 is moved in the lateral direction by an actuating cylinder 16. When the shutter plate 15 is advanced to push the stainless steel made-flexible belt 24 against the lowermost end of the filter box 1 as shown in FIG. 2, the lower opening 56 of said filter box 1 is closed, and when the shutter plate 15 is retracted by said actuating cylinder 16 as shown in FIG. 3, the lower opening 56 of the filter box 1 is opened to allow the passage of filter belt 2 and the falling of separated filter cakes 14 from the filter belt 2. Said filter cakes 14 are then received on an inclined guide plate 55 and discharged outside of the framework 23 by sliding down on said guide plate 55 (FIG. 3).

Further the inside wall of the lowermost end of said filter box 1 and the top face of said shutter plate 15 are provided with sealing members such as rubber sealing (not shown) in order to prevent the liquid material from leaking.

As shown in FIGS. 2 and 3, a feed port 34 for the feeding and discharging of the filtration liquid is provided closely below the above-mentioned shutter plate 15, and the bottom end of said port 34 is communicated with a solenoid valve 13 through a connecting pipe 35, which valve is a change-over valve to feed or discharge the liquid to be treated. During the lower opening 56 of the filter box 1 being closed by the shutter plate 15, the filtration feed from the feed port 34 is introduced into the filter box 1 through a feed aperture 36 under pressure. In this occasion, the liquid does not flow back into the feed port 34 through the feed aperture 36 because the liquid within said feed port 34 is pressurized. Further, said feed aperture 36 may be positioned at any point of the filter box 1 according to the requirement besides the above-explained position.

Further, before the shutter plate 15 is retracted by the action of the cylinder 16 after the filter cake is accumulated, the remaining liquid is sent back into the feed port 34 through the feed aperture 36, and it is discharged through the connectng pipe 35. If the liquid to be filtered contains no granular precipitate, a single plate can be used in place of said feed port 34.

The solenoid valve 13 changes the flow of feed at any desired time by electrical actuation, and in the feeding step, it receives the filtration feed from a high pressure pump (not shown) through the intake pipe 37 and transfers the feed into the feed port 34 through the connecting pipe 35, while in the discharging step, it discharges the feed from the feed port 34 through the connecting pipe 35 to the outlet pipe 38.

In FIGS. 2 and 3, the numeral 39 indicates a guide roller for the filter belt 2 and the stainless steel made flexible belt 24 attached thereto.

In order to prevent the un-smoothness in the unrolling of the filter belt 2 by the accumulation of solid content on the inside wall of the filter box 1, side plates 17 are provided on both sides of the rubber support 6 of filter belt 2, thereby the spaces between them are minimized. Further, when the filter belt 2 is wound on the upper horizontal shaft 3, the outermost surface of the belt 2 can be covered with cloth 18 (FIG. 1) which is coated with vinyl coating material, or in place of the cloth 18, impermeable materials such as rubber adhesive and vinyl coating material may be applied, thereby the action of filtration to the outside direction can be prevented. Therefore, the filtration liquid near the inside wall portion of the filter box 1 is not concentrated leaving as it is, and the liquid can be easily discharged in advance of the unrolling of the filter belt 2 to form clear spaces, accordingly, the smooth movement of the filter belt 2 in the unrolling step is not obstructed.

In the following, the operation of the automatic filter of the present invention will be explained. In the first place, the lower opening 56 of the filter box 1 is closed by the shutter plate 15 (FIG. 2), and the liquid to be filtered is then introduced into the filter box 1 from a high pressure pump through the solenoid valve 13. Thus, when the inside pressure of the filter box 1 is increased by the feed of the liquid, the spaces between the rolled filter belt 2 is filled with the liquid and filtration is caused through the filter member 5 of the filter belt 2 by the feed pressure. The filtrate goes through the permeable core material 4 and the small apertures 7 on the upper horizontal shaft 3 into the hollow portion of said horizontal shaft 3, and then it is discharged from the outlet 22 of said horizontal shaft 22. In the meantime, the filter cake 14 is accumulated between the layers of rolled filter belt 2 to form solid.

With the advance of the filtration, the amount of filtrate becomes less gradually, and when it reaches a certain level, the solenoid valve 13 is actuated by some controlling device to shut off the feed. Further the remaining liquid in the inside wall portion and bottom portion of the filter box 1 is immediately discharged. In this occasion, the discharge of the filtration liquid can be carried out more easily by introducing pressurized air into the filter box 1 through an air valve 57. Further, washing water can be introduced together with said air under pressure, or only such washing water may be introduced under pressure.

After this discharge of the remaining liquid, the shutter plate 15 is opened by the action of the cylinder 16, and at the same time, the rotation of the pulley 10 is started. Thereby, the filter belt 2 on the upper horizontal shaft 3 is unrolled and wound by the lower horizontal shaft 9. In this step, the solidified filter cake 14 falls down to the lateral side as shown in FIG. 3.

The unrolling of the filter belt 2, that is, the winding by the lower horizontal shaft 9 will be stopped when all of the filter belt 2 is unrolled, then the rotation of the horizontal shafts 3 and 9 are reversed to return the filter belt 2 to the original position.

By repeating such rolling and unrolling of the filter belt 2, the filtration and the dischargcd of filter cake can be carried out automatically.

As fully explained in the above, the filtration and the discharge of filtrate can be carried out automatically through the repeated rolling and unrolling of the filter belt according to the present invention. Therefore, the simplification and rationalization of the filtration work can be attained which being very excellent as compared with the conventional high-pressure filter plate method.

It should be emphsized, however, that the specific embodiment described and shown herein is intended as merely illustrative and in no way restrictive of the invention.

What is claimed is:

1. An automatic filter which is characterized in that a filter box is provided at the center portion thereof with a hollow tubular horizontal rotatable shaft having a plurality of small apertures; another horizontal rotatable shaft is provided in the outside portion of said filter box in parallel with said tubular horizontal shaft; a flexible or foldable and liquid permeable long filter belt is attached between said tubular horizontal shaft in the filter box and said another horizontal shaft on the outside of said filter box so as to be rolled and unrolled on said two shafts; a retractable shutter plate to pass said filter belt and to discharge filter cake is provided on one portion of said filter box; and said filter box, filter belt and shutter plate are disposed so as to discharge the filtrate from the filter belt through the core material portion of said filter belt to the outside, and at the same time, to discharge automatically the filter cake accumulated between the layers of rolled filter belt during the unrolling of the filter belt and the opening of said retractable shutter plate.

2. An automatic filter as claimed in claim 1, in which said filter belt comprises a liquid permeable and flexible core material, a liquid permeable and flexible filter members attached on both surfaces of said core material, flexible or foldable supports attached to both longitudinal side edges of said core material and filter members, and a flexible tough sheet material attached to the lower end of said core material and filter members.

3. An automatic filter as claimed in claim 2, in which said filter belt is made of wire-netting as said core material, two sheets of filter cloth as said filter members, flexible rubber supports as said supports, and a stainless steel sheet as said flexible tough sheet.

4. An automatic filter as claimed in claim 2, in which said filter belt is made of wire-netting as said core material, two sheets of filter cloth as said filter members, a plurality of supporting pieces being linked by chains as said supports, exhaust pipes embedded in said core material, and a stainless steel sheet as said flexible tough sheet.

5. An automatic filter as claimed in claim 1, in which said filter belt comprises a plurality of filter frames which are linked together by connecting members in foldable manner to form a long band, and both ends of said filter frames being provided with protective supports.

* * * * *